US011164415B1

(12) United States Patent
Reynolds, III et al.

(10) Patent No.: US 11,164,415 B1
(45) Date of Patent: Nov. 2, 2021

(54) TOUCHLESS, AUTOMATED AND REMOTE PREMISE ENTRY SYSTEMS AND METHODS

(71) Applicant: IDENT LLC, Sacramento, CA (US)

(72) Inventors: Albert Edward Reynolds, III, Folsom, CA (US); Timothy Allen Cook, Las Vegas, NV (US); Mark Andrew Cordano, Sacramento, CA (US)

(73) Assignee: IDENT LLC, Sacramento, CA (US)

( * ) Notice: Subject to any disclaimer, the term of this patent is extended or adjusted under 35 U.S.C. 154(b) by 0 days.

(21) Appl. No.: 17/342,393

(22) Filed: Jun. 8, 2021

Related U.S. Application Data

(60) Provisional application No. 63/085,143, filed on Sep. 29, 2020.

(51) Int. Cl.
   *G07C 9/38* (2020.01)
   *G08B 27/00* (2006.01)
   *G06T 7/73* (2017.01)

(52) U.S. Cl.
   CPC ............. *G07C 9/38* (2020.01); *G06T 7/73* (2017.01); *G08B 27/005* (2013.01); *G06T 2207/10048* (2013.01); *G06T 2207/20084* (2013.01); *G06T 2207/30201* (2013.01); *G06T 2207/30232* (2013.01)

(58) Field of Classification Search
   CPC .......... G07C 9/38; G08B 27/005; G06T 7/73; G06T 2207/10048; G06T 2207/20084; G06T 2207/30201; G06T 2207/30232
   See application file for complete search history.

(56) References Cited

U.S. PATENT DOCUMENTS

| | | | | |
|---|---|---|---|---|
| 9,922,515 | B2* | 3/2018 | Hoy ..................... | G01V 5/0008 |
| 10,138,642 | B2* | 11/2018 | Slagel ................. | G01V 5/0008 |
| 2002/0154032 | A1* | 10/2002 | Hilliard ................. | G08G 1/042 340/933 |
| 2012/0147191 | A1* | 6/2012 | Snoussi ............ | G08B 13/19608 348/159 |
| 2017/0113142 | A1* | 4/2017 | Miyamae ................ | A63F 13/35 |
| 2019/0334889 | A1* | 10/2019 | Ito ....................... | H04L 63/0853 |
| 2020/0042797 | A1* | 2/2020 | Lee ..................... | G06K 9/00718 |
| 2020/0279035 | A1* | 9/2020 | Chang ............... | H04M 1/72412 |
| 2020/0320814 | A1* | 10/2020 | Hastings ................. | G07C 9/28 |

* cited by examiner

*Primary Examiner* — Santiago Garcia
(74) *Attorney, Agent, or Firm* — Smith, Gambrell & Russell LLP

(57) ABSTRACT

A system for interdicting access to a secured venue by automatically detecting the presence of weapons or other threats on attendees as they enter the site is provided. Cameras or other detectors, coupled with machine learning techniques identify from video streams or other sensor signals whether attendees openly or covertly have weapons or other threats on or near their person. In addition, wellness checks such as temperature measurements are performed. The system may also incorporate an automatic ticket scanner.

17 Claims, 7 Drawing Sheets

TOUCHLESS, AUTOMATED AND REMOTE PREMISE ENTRY SYSTEMS AND METHODS

CROSS-REFERENCE TO RELATED APPLICATIONS

This application claims priority to and the benefit of U.S. Provisional Patent Application No. 63/085,143, filed Sep. 29, 2020, which is hereby incorporated herein by reference in its entirety.

BACKGROUND

Protocols, systems and methods for monitoring and controlling the entry of people into premises and venues (sometimes referred broadly as "access control"), both indoor and outdoor, are well known. Many situations require screening of people before allowing them to enter a premises, venue or other access controlled area in an attempt to secure the area. For instances, personal and/or carried-in item screenings may be performed to minimize the potential for unpermitted items from being brought into a controlled area, thereby helping to reduce the risk of physical danger for those within the area, such as ensuring entrants are not carrying deadly weapons or dangerous chemicals. Others focus on screening the health of those entering and monitoring for communicable diseases, such as for COVID-19 risks. Many others need to check the authority or permission of persons wishing to enter by checking their personally identifiable information (PII), such as an ID card, or in some cases, a biologic measure, such as a fingerprint or retina scan, for security clearance. Other situations simply require checking whether the person has prepaid—e.g., purchased a ticket—to enter a venue. Indeed, many use cases require some combination of or all of the above screening protocols and others before allowing access to a controlled area.

Conventionally, modern access control systems and methods have used trained employees, often equipped with equipment and hand held tools, to accomplish pre-entry people screening. Physical safety protocols often include employing security personnel, stationed at the main entrance or all the entrances to a venue, who visually look for exposed weapons, physically pat-down entrants and use metal detecting wands to check for weapons. Increasingly, screening personnel also use hand-held thermometers to measure the temperature of the forehead or arm of the entrant. Other workers may be simple ticket personnel who allow entry into a venue only to those with a valid ticket.

U.S. Pat. No. 9,922,515B2 describes a safety enclosure, detention, and surveillance system with a walled enclosure with impact resistant walls, an entrance door and exit door located in an inner scanning chamber, a storage chamber located in the inner scanning chamber, an x-ray metal detector with a conveyor belt, a walkthrough metal detector, a gas ionization explosives detector, and a weapons depository unit. The inner storage chamber further contains an air conditioning unit and a sedation material unit for storage and release with ports to access the inner scanning chamber by which the sedation dispenser can pump sedation material from the storage chamber into the inner scanning chamber and render a threat incapacitated.

U.S. Pat. No. 10,138,642 describes a portable container which comprises a passing room allowing entry into a second area into a first area, the passing room having at least two openings with a walkway in-between. A barrier device can be located in the walkway but not connected to the first or second opening. A control room is also provided, the control room being connected to the passing room.

However, improvements are needed.

SUMMARY

It is to be understood that the present disclosure is not limited in its application to the details of construction and the arrangement of components described hereinafter and illustrated in the drawings and photographs. Those skilled in the art will recognize that various modifications may be made without departing from the scope of the disclosure.

The systems and methods of the present disclosure may identify potential threats to a venue using a multi-zonal detection regime and various sensing technologies. Information may be received from several zones using one or more sensing systems or technologies in each zone. Zones may be defined to extend the proximity of threat detection further from the entrance to a secure location such as an event or building. The portable structures of the present disclosure may provide mobility for converting a location into a multi-zonal detection system.

One aspect of the disclosure provides a modular on-site detection system comprising: a portable structure configured to be placed on a surface between a first area and a second area, the portable structure comprising a first wall configured to face the first area and a second wall opposite the first wall and configured to face the second area; a plurality of passage lanes defined between the first wall and the second wall, where each of the passage lanes is physically partitioned from each other; a control area at least partially disposed between the first wall and the second wall and physically partitioned from each of the passage lanes; a plurality of entrance openings formed in the first wall and a plurality of exit openings formed in the second wall, each pair of the entrance openings and exit openings associated with a respective one of the passage lanes to allow one or more entrants to pass from the first area into the respective one of the passage lanes and from the respective one of the passage lanes to the second area; a network of threat detection systems in data communication with at least a monitoring system, wherein the network comprises: a parking lot system configured to capture information relating to contents of a target parking lot or activities occurring in the target parking lot; a first sensor system comprising one or more first video cameras secured to the portable structure and configured to face the first area and a first intelligent video recognition software configured to analyze the information captured by the one or more first video cameras for automatically screening at least a portion of the first area for visible threats; an intelligent covert weapons detection system comprising a multi-sensor gateway disposed in each of the passage lanes for scanning one or more entrants in the passage lanes for covert suspect objects as the one or more users move through the passage lane; an intelligent thermal detection system comprising one or more thermal sensors disposed in each of the passage lanes for measuring a temperature of one or more users in the passage lanes; an identification system disposed to determine an identification of at least one or more of the entrants in each of the passage lanes; a second sensor system comprising one or more second video cameras secured to the portable structure and configured to face the second area and a second intelligent video recognition software configured to analyze the information captured by the one or more second video cameras for automatically screening at least a portion of the second area; and the monitoring system disposed in the control room and configured to receive information from each of the parking lot system, the first sensor system, the intelligent covert weapons detection system, the intelligent thermal detection system, the second sensor system, and the identification system, and to provide feedback based at least on the received information, wherein the monitoring system is configured to determine, based on the received information and a set of security rules, an alarm condition indicative of one or more of the entrants posing a threat, and wherein the monitoring system is configured to transmit an alarm notice to one or more connected devices indicative of the alarm condition and comprising information relating to the threat.

In one aspect, a method of multi-zonal threat detection from a portable structure, the method comprises: disposing a portable structure on a surface between a first area and a second area, the portable structure comprising: a first wall configured to face the first area and a second wall opposite the first wall and configured to face the second area; a plurality of passage lanes defined between the first wall and the second wall, where each of the passage lanes is physically partitioned from each other; a control area at least partially disposed between the first wall and the second wall and physically partitioned from each of the passage lanes; a plurality of entrance openings formed in the first wall and a plurality of exit openings formed in the second wall, each pair of the entrance openings and exit openings associated with a respective one of the passage lanes to allow one or more entrants to pass from the first area into the respective one of the passage lanes and from the respective one of the passage lanes to the second area; receiving lot information from a parking lot system configured to capture information relating to contents of a target parking lot or activities occurring in the target parking lot; receiving threat information from each of: a first sensor system comprising one or more first video cameras secured to the portable structure and configured to face the first area a first intelligent video recognition software configured to analyze the information captured by the one or more first video cameras for automatically screening at least a portion of the first area for visible threats; an intelligent covert weapons detection system comprising a multi-sensor gateway disposed in each of the passage lanes for scanning one or more entrants in the passage lanes for covert suspect objects as the one or more users move through the passage lane; an intelligent thermal detection system comprising one or more thermal sensors disposed in each of the passage lanes for measuring a temperature of one or more users in the passage lanes; an identification system disposed to determine an identification of at least one or more of the entrants in each of the passage lanes; and a second sensor system comprising one or more second video cameras secured to the portable structure and configured to face the second area and a second intelligent video recognition software configured to analyze the information captured by the one or more second video cameras for automatically screening at least a portion of the second area; and determining, based on the received threat information and a set of security rules, a visible alarm condition indicative of one or more of the entrants posing a visible threat; determining, based on the received threat information and a set of security rules, a covert alarm condition indicative of one or more of the entrants posing a covert threat; determining, based on the received threat information and a set of security rules, a health alarm condition indicative of one or more of the entrants exhibiting a health condition; determining, based on the received threat information and a set of security rules, an identity alarm condition indicative of one or more of the entrants posing an identity threat or failing to provide proper access identity; transmitting an alarm notice to one or more connected devices indicative of one or more of the visible alarm condition, the covert alarm condition, the health alarm condition, or the identity alarm condition, and comprising information relating to the threat.

Determining an alarm condition indicative of one or more of the entrants posing a threat is based on a machine learning algorithm.

In one aspect, a modular on-site detection system comprises: a portable structure configured to be placed on a surface between a first area and a second area, the portable structure comprising a first wall configured to face the first area and a second wall opposite the first wall and configured to face the second area; a plurality of passage lanes defined between the first wall and the second wall, where each of the passage lanes is physically partitioned from each other; a control area at least partially disposed between the first wall and the second wall and physically partitioned from each of the passage lanes; a plurality of entrance openings formed in the first wall and a plurality of exit openings formed in the second wall, each pair of the entrance openings and exit openings associated with a respective one of the passage lanes to allow one or more users to pass from the first area into the respective one of the passage lanes and from the respective one of the passage lanes to the second area; a first sensor system comprising one or more first video cameras secured to the portable structure and configured to face the first area and a first intelligent video recognition software configured to analyze the information captured by the one or more first video cameras for automatically screening at least a portion of the first area; an intelligent covert weapons detection system comprising a multi-sensor gateway disposed in each of the passage lanes for scanning one or more users in the passage lanes for covert suspect objects as the one or more users move through the lane; an intelligent thermal detection system comprising one or more thermal sensors disposed in each of the passage lanes for measuring a temperature of one or more users in the passage lanes; an identification system disposed to determine an identification of at least one or more of the users in each of the passage lanes; a second sensor system comprising one or more second video cameras secured to the portable structure and configured to face the second area and a second intelligent video recognition software configured to analyze the information captured by the one or more second video cameras for automatically screening at least a portion of the second area; and a monitoring system disposed in the control room and configured to receive information from each of the first sensor system, the intelligent covert weapons detection system, the intelligent thermal detection technology, the second sensor system, and the identification system, and to provide feedback based at least on the received information, wherein the monitoring system is configured to determine, based on the received information and a set of security rules, an alarm condition indicative of one or more of the users posing a threat.

BRIEF DESCRIPTION OF THE DRAWINGS

The following drawings show generally, by way of example, but not by way of limitation, various examples discussed in the present disclosure.

Further advantages of the present disclosure may become apparent to those skilled in the art with the benefit of the following detailed description of the preferred embodiments and upon reference to the accompanying drawings in which.

DETAILED DESCRIPTION

Figure 1:
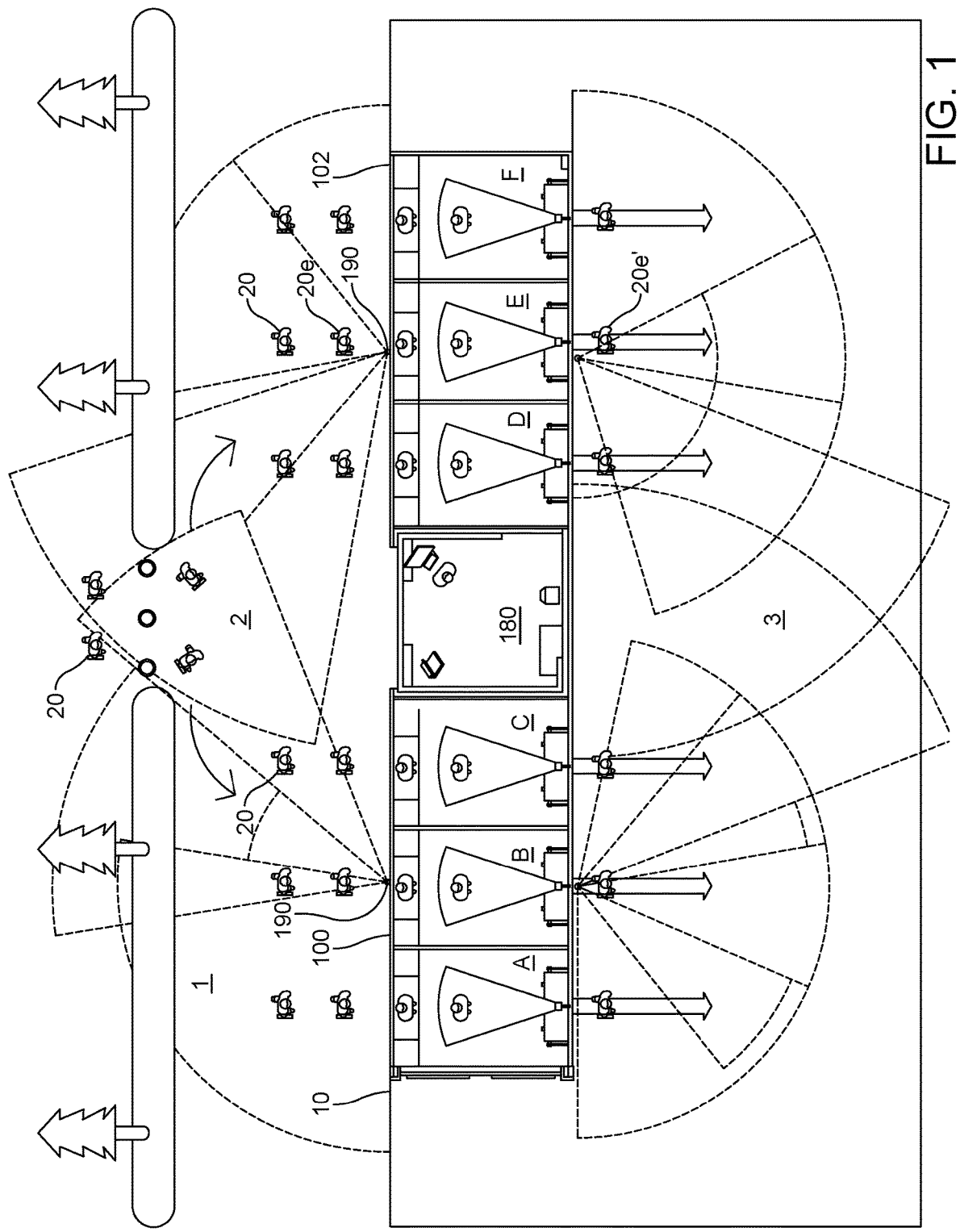
FIG. 1 depicts a diagrammatic top view of one exemplary Mobile Onsite Detection System (MODS) system in accordance with one non-limiting embodiment of the present disclosure, showing it in use in an exemplary onsite location.

The present disclosure relates to systems and methods for securing a venue and preventing threats from entering the venue or facility.

The systems and methods of the present disclosure may identify potential threats to a venue using a multi-zonal detection regime and various sensing technologies. As an example, a threat may comprise a weapon, a disease, or non-paying or uninvited guests. Additionally or alternatively, the systems and methods may comprise an identification procedure to identify one or more guests to the venue. As a further example, the systems and methods may be touchless and may not require venue personnel or security personnel to engage the potential entrants (outside of a threat or alarm condition). As yet a further example, identification procedures may be used in cooperation with threat detection.

The present disclosure relates to a networked and integrated multi-level threat and safety on-site premise access control platform, system and method. As used herein, the systems may be referred to as a Modular Onsite Detection System, or MODS system. The systems and methods of the present disclosure may provide automated, touchless, and, in some instances, un-manned, screening of persons for entry into secured premises that solves the aforementioned problems and more. The present disclosure also discloses a comprehensive, all-in-one solution heretofore not seen by preferably employing modular, portable, self-contained, and customizable container units that are transportable from venue to venue using conventional transportation methods and techniques. The present disclosure may be particularly useful for outdoor and indoor venues that host events, including county fairs, outdoor concerts, sporting events, golfing tournaments, car racing events, parades, festivals, military bases, military functions, and the like. Other controlled-access areas or uses are contemplated.

The systems and methods of the present disclosure provide a comprehensive monitoring and notification system that identifies and tracks any screened entrant that triggers an "event," where an "event" may be defined as an entrant (e.g., person) that triggers any one or more of the automated screening systems employed by the present system. Thus, the system identifies any entrant who may be suspected of carrying a weapon, may be ill, or may otherwise not be qualified to enter a venue. The system may then notify local and/or remote personnel to enable further screening steps to be taken, if necessary, such as performing an additional check or investigation regarding the entrant in person, for example.

The present disclosure may employ a companion application ("app"), in any number of forms, including, but not limited to, a mobile app for a mobile device or a downloadable application on a computer. The companion app may be in communication with the systems of the disclosure, and may notify an app user of an event or perceived threat. The companion app may send images or video feeds of the entrant associated with the event or perceived threat.

Referring now to the drawings, like reference numerals designate identical or corresponding features throughout the several views.

In an aspect, an exemplary "Mobile Onsite Detection System", or MODS 100 is shown in FIGS. 1-5. The MODS 100 may be a highly specialized, self-contained, mobile, intelligent, people-entry technology-based screening platform, system and method. The MODS 100 may be configured for security screening features (e.g., a specified set of security protocols) by the venue. The MODS 100 may be requested (e.g., ordered, via, for instance, an on-line ordering site) by, for example, a venue, an event manager or coordinator for temporary or permanent use by the venue. The system 100 may be configured modularly, such that individual system components may be easily (a) transported to, (b) set-up at; (c) operated at, and then (d) removed from any venue, if and when needed. In use, the MODS 100 may be sized to handle speedy, high throughput, contactless (no turnstile) clearing of small, medium or large quantities of people. In embodiments, a MODS may comprise sophisticated artificial intelligence (AI) software interpreting and driving the signals coming from the monitoring hardware. The use of such AI software may enable configuration of a touchless or near-touchless, and, in some instances, humanless, fast and reliable screening of entrants (e.g., people and objects) for safety and health, and as well as provide ticket status verification and visual verification of compliance with entry requirements (e.g., wearing of a facemask) for entrants to or users of a venue.

Thus, as seen in the exemplary birds-eye view of FIG. 1, one embodiment of the portable, self-contained MODS 100 is shown, placed in a large open outdoor location 1 that may be remote from other buildings. In this example, the venue may be an outdoor concert or county fair set up as a temporary venue. The perimeter of the venue may be secured by fencing or other structure(s) 10 that seek to prevent unauthorized entrants from entering therein at any point other than the designated entry point (e.g., the multi-lane MODS 100 entry point). In particular, the MODS 100 may be built from a single, solid, rectangular boxlike shell structure 100a. The MODS 100 and barriers 10, such as fencing, may be connected to each end at the front, or unsecured side of MODS 100, defining an unsecure first area 2 and a secure second area 3. In such an instance, the secure second area 3 may be the venue into which people wish to enter. As shown, many attendees or ticketholders 20 for an event, e.g. an outdoor concert, at venue 3, may park their cars in an unsecure first area 2 (e.g., adjacent a parking area) (denoted at the top of FIG. 1), and as shown by the arrows, may be directed to walk toward secure second area 3, and in particular toward the front side 102 and lanes A-F of MODS 100.

Figures 2A, 2B:
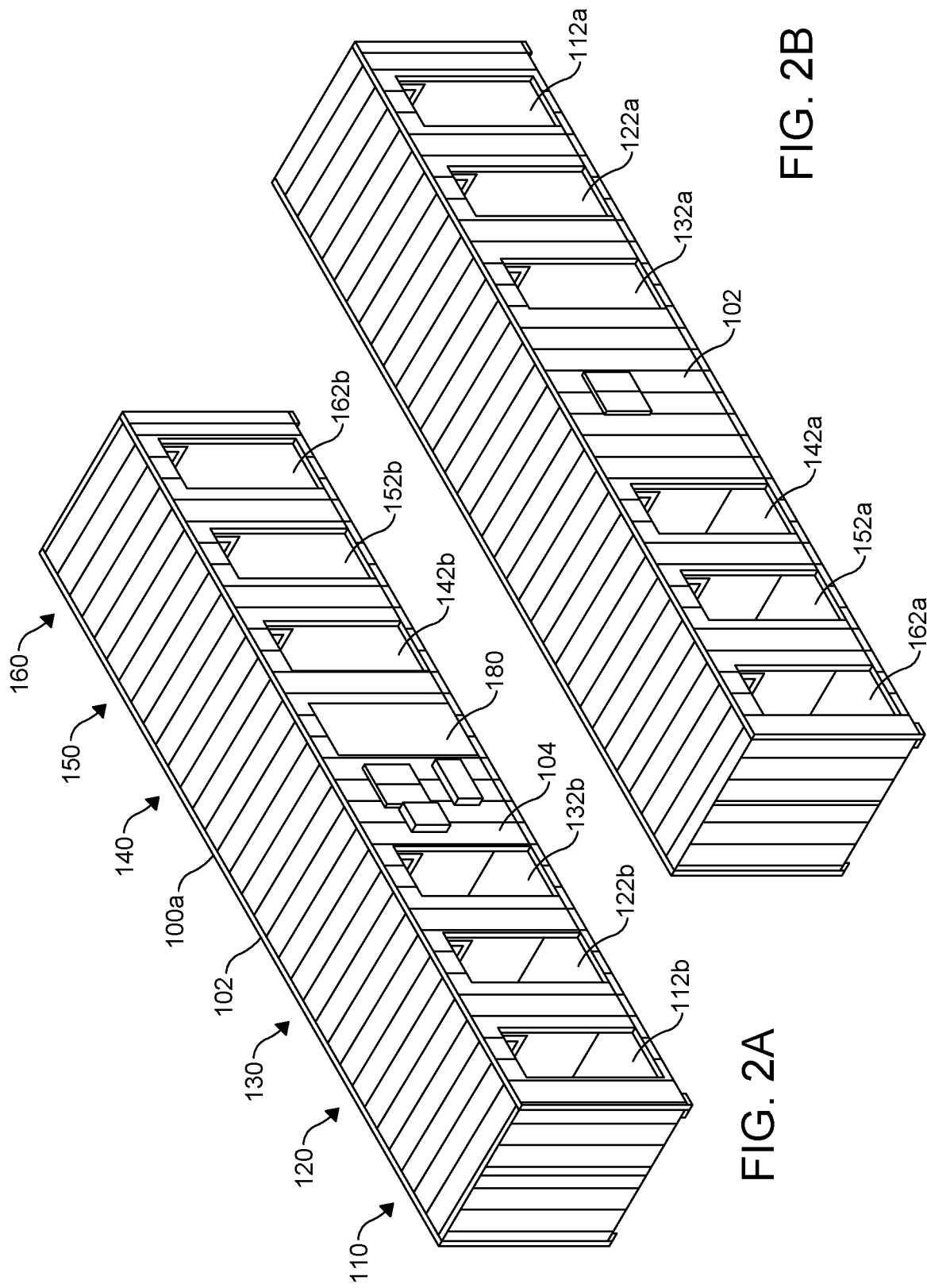
FIG. 2A depicts a perspective view of the inventive MODS system shown in FIG. 1, showing a second side.
FIG. 2B depicts a perspective view of the inventive MODS system shown in FIG. 1, showing a first side.

FIGS. 2A and 2B show perspective views of the physical structure 100a that may be used as the "shell" for the MODS 100 as shown in FIG. 1. FIGS. 2A and 2B illustrate a configuration of a MODS structure 100a comprising a first side 102 (e.g., a "non-secure" side) facing a non-secure area 2 and a second side 104 (e.g., a "secure" side, i.e., the side facing venue 3 in FIG. 1). As depicted, the MODS structure 100a may include a plurality of passage lanes, for instance, passage lanes 110, 120, 130, 140, 150 and 160, through which entrants may walk for screening without touching any equipment (also denoted in FIG. 1 as lanes A-F, respectively). The MODS structure 100a may also include a control room 180 or office. As an example, ticketholders 20 intending to enter the venue 3 may walk through any of passage lanes 110, 120, 130, 140, 150 and 160, by entering lane entrance openings 112a-162a, respectively, and exiting the passage lanes A-F via the exit openings 112b-162b, respectively.

Thus, turning back to FIG. 1, an exemplary ticketholder 20e having purchased a ticket to enter the venue 3, may have walked from a parking lot into the first area 2 and toward the second area 3. The ticketholder 20e, as all entrants 20, may be screened for at least three (3) threat detection levels, namely, for exposed weapons, illegal substances and/or substance use, covert weapons, and elevated body temperature, as well as for identity such as a valid electronic ticket (e-ticket) or pass, as detailed below. Other threat detection modalities may be used. As an example, aerial detection and parking lot detection may be used to gather information relating to potential threats, which may be used alone or in combination with other entrant and threat information.

As seen, ticketholder 20e has chosen to walk through lane E (150 in FIG. 2a). Moving at a comfortable walking speed, as the ticketholder 20e enters lane entrance 152a and walks through the lane 150, the ticketholder 20e may be automatically screened by the various technologies installed therein (to be discussed below), and out lane exit 152b and into the second area 3 such as a venue or event area. The control room, or office, 180, may be situated in the middle of the MODS 100, and may comprise a door and window on secure side 104 and a window on unsecure side 102. The control room 180 may house networked computer monitoring equipment, such as the display shown being monitored by a security officer, connected to the screening technology and threat detection installed on and in the MODS 100.

Figure 3:
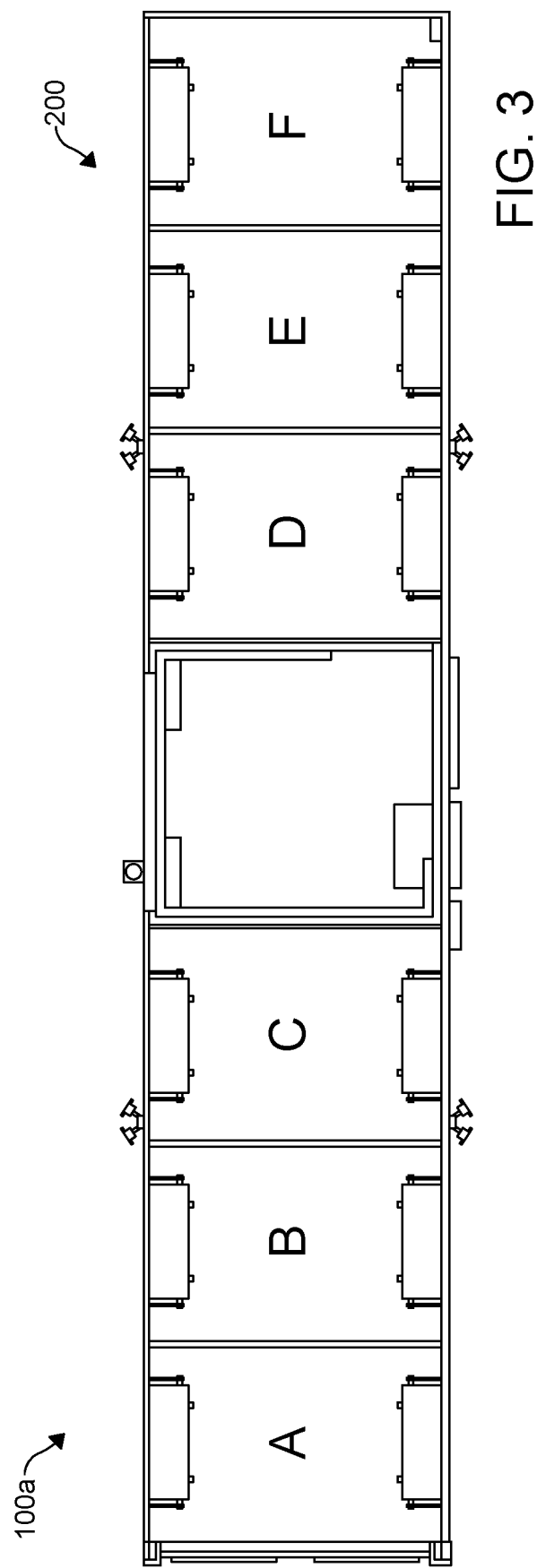
FIG. 3 shows a diagrammatic top view of the MODS system shown in FIG. 1.

It should be understood that a MODS structure 100a may be made from any suitable material, size and construction method, as will be understood by those with skill in the art. FIGS. 2A, 2B and 3 show some embodiments of the MODS structure. As seen, lane entrances 112a-162a and corresponding lane exits 112b-162b may be fabricated openings in the MODS system 100 with walls partitioning the lanes A-F (110-160). Doors may block access to entrances or exits of the lanes. For instance, in some embodiments roll-up doors may be installed at all lane entrances 112a-162a and lane exits 112b-162b in order to securely close all openings when not in use at a venue, and during shipping MODS 100. Moreover, as seen in FIG. 3, MODS 100a structure may be installed (or preinstalled) with flood lights, electrical power or wiring for easy connection to a power source to power all equipment, an HVAC system, a cellular networking antenna, and other systems that may be desirable. Indeed, where conventional power may be not readily available, as desired for suitable outdoor venues, MODS 100a may be equipped with solar power generating technology, such as solar panels, and energy storage, such as batteries, to generate the electricity needed to power all MODS 100 technologies.

The dimensions and other details of the outer shell of structure 100a may vary depending on the particular application. In some embodiments the outer shell may be designed to ease the transportation requirements of the MODS system 100, for instance to allow for easy integration with existing truck, train, or ship facilities or vehicles. Screening, monitoring and networking components of the MODS system of the present disclosure may be advantageously all self-contained within or on the structure (e.g., MODS unit 100a) in use, requiring no other structures and only an electrical power connection for operation. Moreover, the computer server and networking components that may not be safely shipped with the structure 100a may be easily packaged for shipment. This design makes the MODS 100 of the present disclosure particularly attractive for temporary leasing contracts, where a single MODS 100 unit may be leased for and shipped to a particular temporary venue. Once the venue has completed use of the MODS unit, the unit may be easily transported to another location for use there. In some embodiments, an electrical power connection may not be required, as solar panels and energy storage systems connected to or integrated with the MODS 100 may supply adequate electrical power.

The novel combinations and physical placements of the touchless screening technologies important to many embodiments of the present disclosure will now be discussed. In some embodiments, all lanes of a MODS may be configured identically; namely, each MODS unit may be fitted with the same hardware/screening equipment in the same relative locations within each lane, so that any entrant 20, as in FIG. 1, may enter any lane and be screened the same way as if that entrant 20 entered any other lane. In other embodiments, one or more lanes of the MODS system may be uniquely or differently configured, as desired by the venue. For example, one lane in a multi-lane MODS unit may be fitted with different, that is, more or less, technology than other lanes through which a subset of entrants may be funneled. One example of this may be where at least a portion of the MODS units (e.g., 5 lanes of a 6-lane MODS system, e.g., lanes A-E in FIGS. 1-5) may be configured to screen people with pre-purchased tickets using a fully automated threat detection screening configuration in combination with ticketless entry (requiring no human personnel). At least a portion of the remaining units (e.g., a 6th lane, e.g., lane F of FIGS. 1-5) may be configured for people who did not pre-purchase a ticket, or have a problem with their e-ticket, which may be accessible via a mobile device), thereby requiring some human intervention or assistance, such as by a ticket seller or technical personnel located in the proximity of the exit of the designated lane or lanes.

Figure 4:
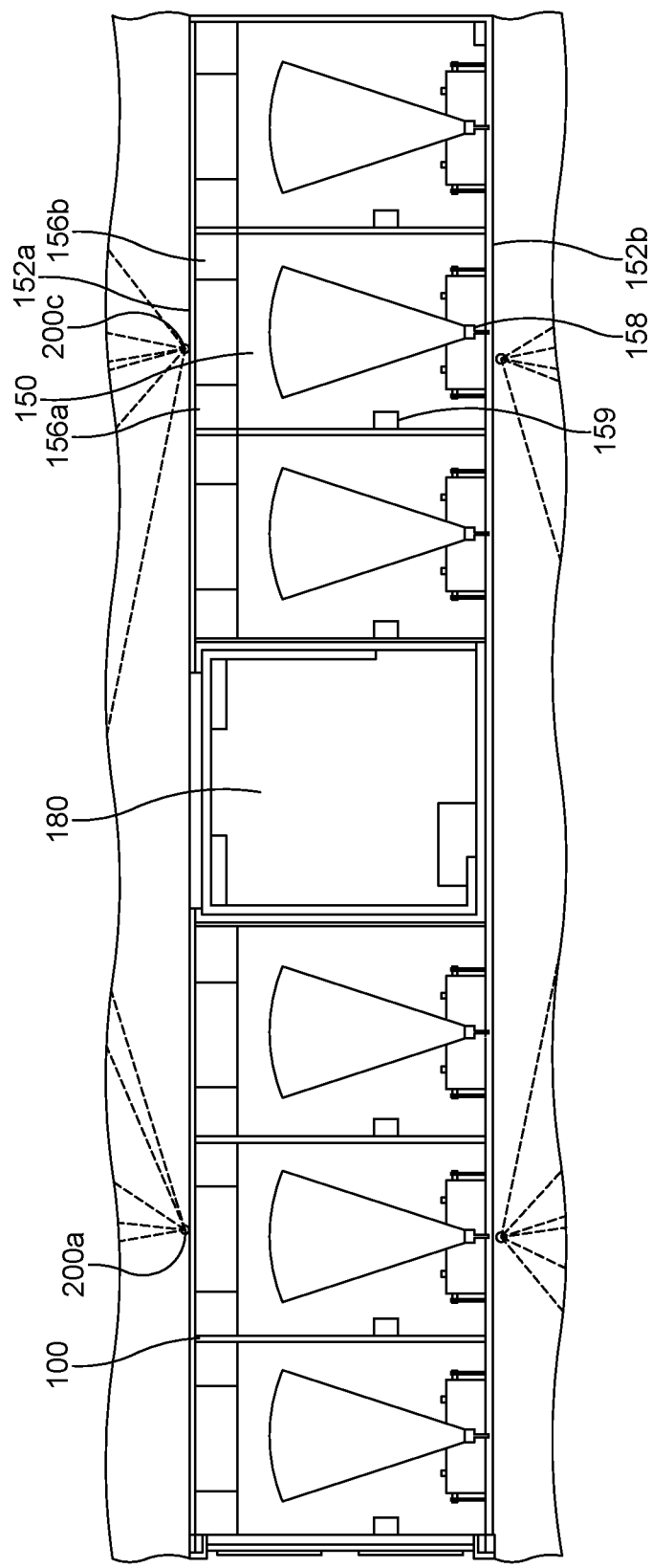
FIG. 4 shows a diagrammatic top view of the exemplary MODS system shown in FIGS. 1-3, showing details of one of its passage lanes.

The multi-zonal, threat detection screening technologies implemented in one preferred embodiment will now be discussed in conjunction with FIGS. 1 and 4, where six (6) lanes (A-F) of the MODS 100 may be equipped with identical screening technology. The specific details for the lanes and ticketholder traffic flow are described with respect to one lane, namely, lane E, and one entrant 20e in FIG. 1. As the foot traffic, comprising ticketholders 20 enters an unsecured area such as the first area 2 from, say, a parking lot, a first layer of security, "threat detection level 1", optically scans for exposed weapons and/or illegal substances carried by any person. This may be accomplished using, for instance, a networked, video monitoring and recording system, with multiple, wide angled cameras 200a-200c (2 or 3 for a standard sizes MODS), denoted by black dots 190, mounted on top of the non-secured side of MODS 100a and facing unsecured area 2. As shown, each camera may be set to have a field of view of a given angle and distance, defining a coverage zone denoted by the first area 2, such that the coverage zones of the multiple cameras will overlap each other. This arrangement provides full video coverage of the portions of the first area 2 that ticketholders 20 will walk through as they approach the MODS 100. Information captured by the sensors such as cameras 200a-200c may be processed by intelligent video recognition software. As an example, information (e.g., images) from the cameras 200a-200c and/or other sensors may be processed by exposed weapons detection software, such as the PATSCAN™ VRS-W (for "Video Recognition System-Weapons") software from PatriotOne Technologies. This software is configured to scan, in real time, the video feed for suspected images of captured objects on ticketholders against libraries of thousands of weapons of all kinds, and may trigger an "event"—a system alert—when a threat object is detected before the entrant with the suspected exposed weapon enters a MODS lane. Other intelligent video recognition software such as exposed weapons detection software may be used.

The MODS 100 may comprise or may be equipped with networked video surveillance software to work in conjunction with the exposed weapons detection software to enable computers to display both locally, for example in control room 180 as well as remotely, the video feeds from threat detection level 1 visual cameras 200 and/or other sensors. An example of such software may be the CompleteView 2020 software package from Salient Systems, Inc. As explained above, if an event is triggered, personnel may address it by approaching the ticketholder associated with that event, before the event becomes a problem for the venue. Other software may be used.

Various security, detection, and verification systems may be installed inside one or more lanes of the MODS system 100. Such systems may be used to screen entrants, for instance, a ticketholder 20e entering a lane (e.g., lane E or lane 150) of MODS 100. As the ticketholder 20e crosses the entrance threshold 152a, the ticketholder 20e may encounter a second layer of screening (e.g., a second line of weapons defense), or "threat detection level 2"—namely, a covert item detection or Covert Weapons Detection (CWD) system. As an example, a covert item detection system may be or comprise a plurality of Multi-Sensor Gateways, or MSGs 156a, 156b located at the entrance of the passage lane capable of detecting hidden items such as weapons or blacklisted items in both "uncluttered" (a single isolated weapon) and "cluttered" (a weapon mixed with other items, such as in a backpack) environments; (b) related interpretive software, such as the MSG software from PatriotOne; and (c) a visual camera 159 (e.g., as seen in FIG. 4) installed in a lane configured to capture images/video of any person carrying a suspected weapon detected by the MSG hardware/software.

The multi-sensor gateways may comprise various probing and detection techniques including, but not limited to, sending or receiving electromagnetic radiation and detecting the response, detection of any electromagnetic waves, detection of biological agents or chemicals, as well as detection of radioactive materials or their byproducts or emissions. The MSG offers detection of concealed weapons or illegal substances on people and in bags using AI/machine learning coupled with magnetic moment techniques. An exemplary machine learning technique may be a convolutional neural network (CNN) trained on certain blacklisted items such as weapons identification or contraband. The Multi Sensor Gateway (MSG) allows for the discovery of a "weapon signature" (i.e., object shape—handgun, rifle, knife or bomb), with its unique sensor configuration which may detect and identify where on the individual's body or bag the metal threat object resides.

In one embodiment, as an entrant 20 continues to walk through lane E, entrant 20 may be then met with a third screening system (e.g., for "threat detection level 3" screening). Third screening system may be automated and/or touchless. A third screening may be configured to detect one or more physiological characteristics of entrants (e.g., thermal skin temperature) indicating a potentially ill entrant that may be suffering from an airborne or otherwise communicable disease or illness, such as COVID-19. In the present embodiment, this subsystem is powered by a thermal camera 158 that senses temperatures of objects in a zone, denoted by the shaded cone shown in FIG. 4, and related software called VRS-T for Video Recognition System—Thermal, by PatriotOne. In an example embodiment, the camera may be an FDA-approved FLIR—A400 thermal camera 158 that, when paired with the VRS-T system, scans thermal skin temperature on the face of the ticketholder 20e to check for elevated body temperature. This system may be configured for a pass/fail check, indicating simply whether or not the ticketholder 20e has a fever (e.g. a body temperature ≥38° C.) that may be indicative of a condition. If the system returns a "positive" or "fail" for the person, the process may proceed by directing that person for further testing or refusing him entrance to venue 3. Alternative embodiments may use alternative measures of health indicators such as the presence or absence of certain chemical or biological markers or by analysis of the person's behavior (e.g. coughing, sneezing, or erratic gait) which may be indicative of poor health.

The MODS 100 may be equipped with an automated identification system, which may be or comprise a ticket scanning post, a wireless card reader, facial recognition based on input from the camera 159, other identification means. As another example, when the ticketholder 20e is exiting lane E, the ticketholder 20e may be directed to present an e-ticket or code, such as a barcode or QR code, on his mobile device or a code printed on a piece of paper the ticketholder 20e brings from home. The ticketholder 20e may present the ticket to an automated code reader that reads the code and serves as a ticket attendant. This ticket information may be used alone or in combination with other collected information for processing threat detection and alert messages.

Thus, as seen in FIG. 1, when the person passes all threat detection levels and present a valid e-ticket, he is cleared as entrant 20e' and is free to proceed into venue 3. If desired, MODS 100 may also be equipped with general security cameras installed on venue side of MODS 100, for general monitoring of venue 3.

Figure 6:
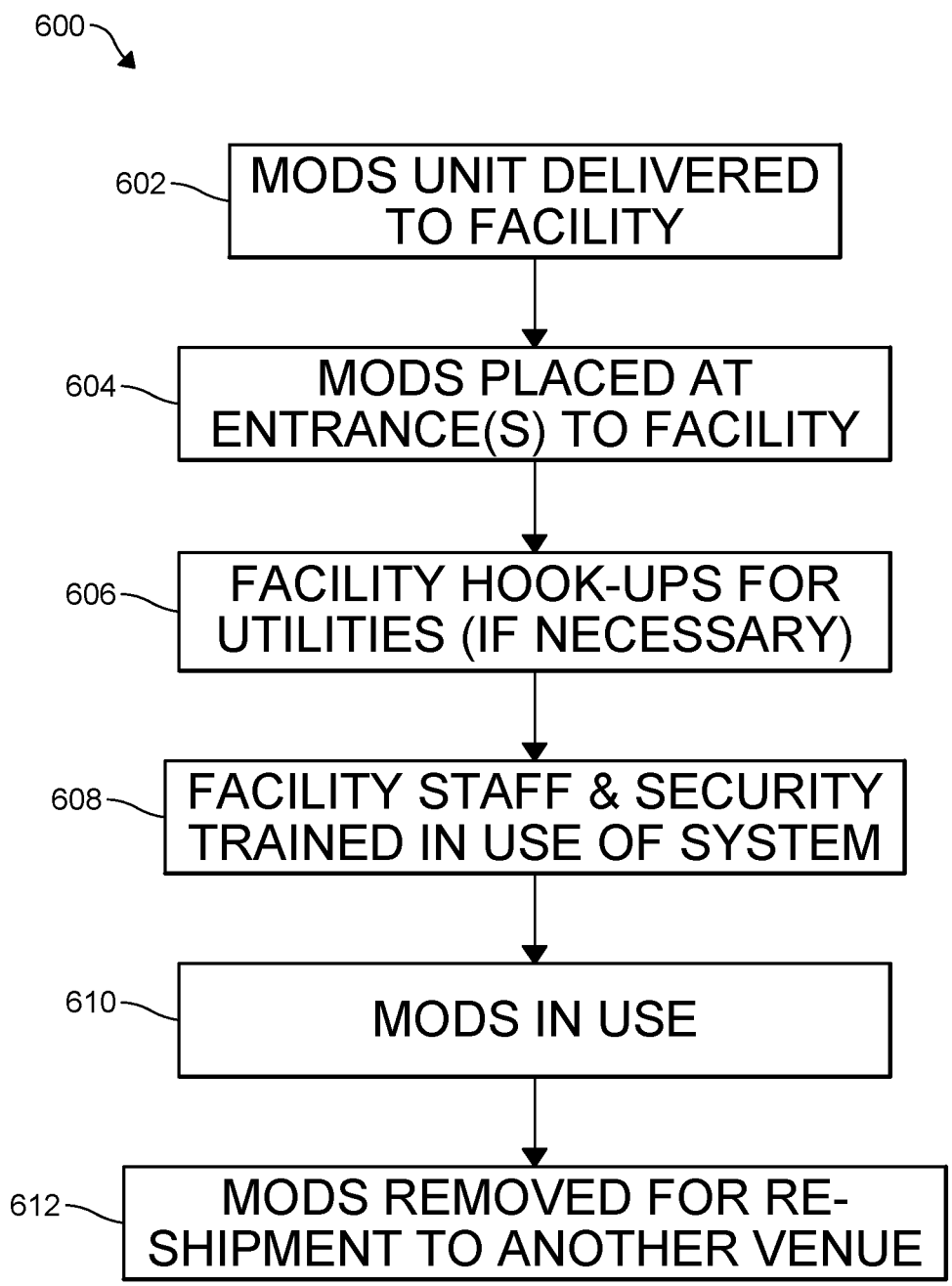
FIG. 6 shows a block flow diagram showing an exemplary process for setting up the present disclosure in a remote location, in accordance with one non-limiting embodiment.

FIG. 6 shows a general process flow of using the MODS (e.g., MODS system 100 (FIG. 1)). A MODS system 100 may be shipped to the venue or facility, at 602. Due to the modular mobile nature of the MODS, the system may be customized for a given event or facility. The portable structures of the MODS may be shipped to any location that may receive the structure. The units are placed at the facility, at 604. Utility hook ups are made to the MODS unit, if required, 606. For some embodiments, independent energy generation and storage devices are shipped with the equipment thus removing the need for connections to external utilities. Facility staff are trained on the use of the system 608. The MODS are used to protect the site from unauthorized access and to protect against health or weapons threats from attendees 610. When the venue no longer requires the MODS, the units are transported to the next venue or to storage 612.

Figure 7:
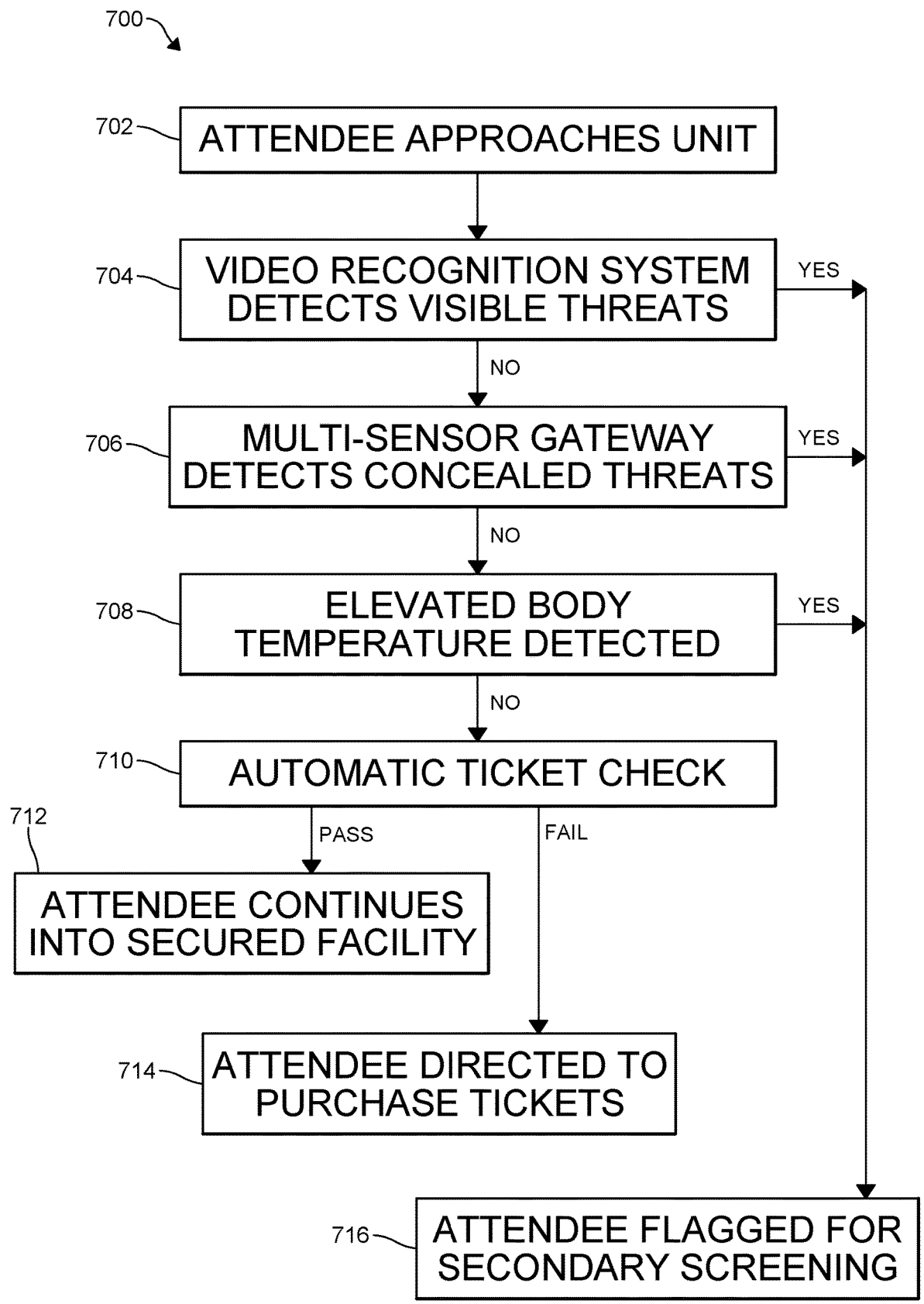
FIG. 7 shows a block flow diagram showing an exemplary process for using the present disclosure, in accordance with one non-limiting embodiment.

This process of various checks and detection of threats is shown in a block diagram in FIG. 7. With reference to FIG. 7, an example method 700 is described. At 702, an event attendee or entrant approaches the MODS unit. A first video recognition system may detect visible threats in real-time, at 704. The first video recognition system may be configured (e.g., trained, modelled) to detect visible items, suspect interactions, or general behavior of people or vehicles. As an example, the first video recognition system may be configured to detect visible contraband or weapons. As another example, the first video recognition system may be configured to detect intoxicated behavior or altercation behavior such as fighting. At 706, as the attendee passes through the unit, multi-sensor gateways (MSG) may scan for concealed items or weapons, such as knives, guns, rifles or bombs. Other information may be determined using the MSG. The attendee may be further scanned for elevated temperature, at 708. The event attendee may be identified, such as by swiping their event ticket (e.g., e-ticket) across a ticketless scanning solution, at 710. Based on at least the information from steps 704-710, the attendee may be allowed to pass into the secured facility.

However, a second video recognition system may be configured to monitor entrants after exiting the MODS unit. The second video recognition system may be configured (e.g., trained, modelled) to detect visible items, suspect interactions, or general behavior of people or vehicles. As an example, the second video recognition system may be configured to detect visible contraband or weapons. As another example, the second video recognition system may be configured to detect intoxicated behavior or altercation behavior such as fighting. In certain instance entrant behavior may change after exiting a security line, thus it may be beneficial to have intelligent analysis of behavior and interactions after an entrant has exited the MODS unit. Such information may be used alone or in combination with data collected from other detection zones, in accordance with the present disclosure.

If at any time during this screening process a threat should be detected, onsite security are notified in real-time, and may move the individual to a secondary screening areas for further investigation prior to providing event access, at 716. Should the attendee require a ticket, they will be directed to the ticket booth or vending machine, at 714.

It should be understood that the multiple threat detection systems, general video monitoring systems, ticketless entry systems and related software in a MODS platform are all part of a secured network to provide intelligent monitoring, communications and management for operators of the platform that may be both local (in the office 180) and remote from a MODS systems.

Figure 5:
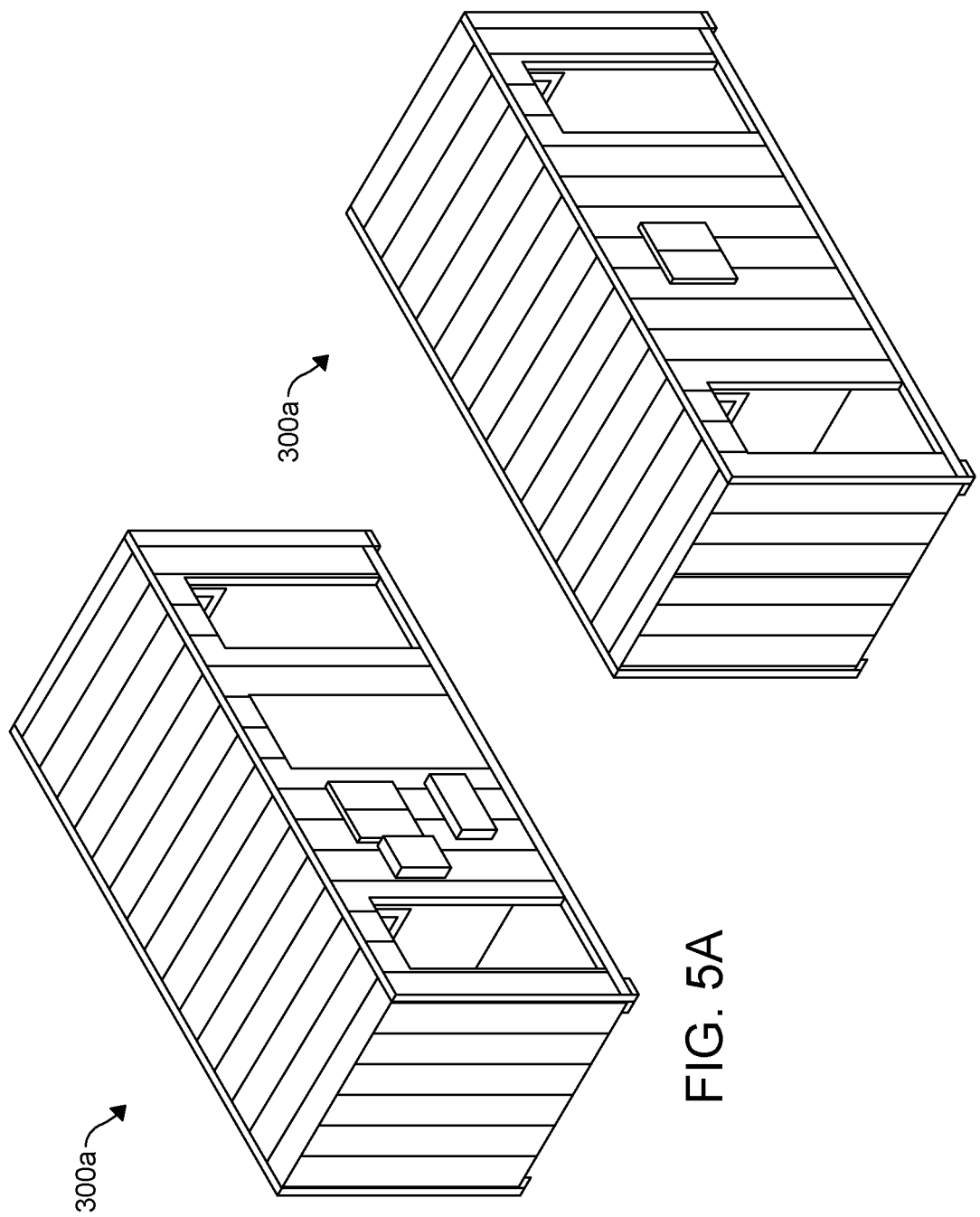
FIGS. 5A-5B show views of a MODS system in accordance with another non-limiting embodiment of the present disclosure.

It is also understood that FIGS. 1-4 show one sized MODS according to one embodiment of the present disclosure. Other sizes and shapes are within the scope of the disclosure. For example, FIG. 5 shows an alternative MODS structure 300a, namely a 2-lane MODS having an office between the two lanes. This much smaller model may incorporate the same technology as the full-size unit 100a or any combination thereof to create a MODS 300. Also, the system of the present disclosure may be made from any sturdy, portable shell that meets the needs of the application.

The present disclosure also contemplates the use of onsite security personnel to deal with detected threats in real time. Accordingly, as an example only, security personnel "on the ground" anywhere in the unsecure first area 2 or in the secure second area 3 may be dispersed outside of the control room 180 in the MODS 100 and connected to the network of the MODS 100 system. In some embodiments, personnel may be equipped with mobile devices, such as tablets or phones, having a dedicated MODS security app loaded thereon that is integrated with MODS 100 computer network. Thus, upon the occurrence of an "event" or threat alert or warning, in addition to personnel on dedicated devices in control room 180 or at remote locations, the app may alert the holder of the mobile device and may send a live video feed of the person 20 associated with the event.

A monitoring system may be configured to transmit an alarm notice to one or more connected devices indicative of an alarm condition and comprising information relating to the threat. The alarm condition may be triggered based on a set of rules or thresholds relating to one or more of positive identification of visible threats, identifications of covert threats, failure of identification, failure of approved access, identification of health concern, suspect behavior or interactions, or the like. Various items or behaviors may be whitelisted or blacklisted as part of the rules that determine alarm conditions. Data from one or more of the security zones may be collected and used alone or in combination to determine triggering of an alarm condition. The alarm notice may comprise any level of information relating to the alarm condition and events leading to the triggering of the alarm condition. The alarm notification may include identification of the items or behavior, identification of the entrant that is associated with the alarm condition, or other details that may be pertinent to resolving the threat. An alarm notice may be sent to connected devices that are local to the MODS unit or remote. The alarm notice may be broadcast to security personnel in the area of the suspect entrant or to any number of devices or people. The alarm notice may be sent to authorities such as local police of government.

By incorporating AI-powered threat detection solutions, visitors to an event or sports venue may be quickly screened for visible and concealed threats at the outer perimeter of a facility's plaza or entry point, so that, when entering the secure area, all are ensured a great experience. The threat detection solutions of the present disclosure leverage advanced AI capabilities, correlating data from multiple sensing devices, in near-real time, allowing for very high accuracy, and a pre-emptive approach to minimizing or eliminating risks or threats. By looking for, and identifying risks first, and then identifying individuals, the solution also protects all attendees' privacy and civil liberties. If a threat is detected, whether associated with weapons, or health risks, onsite security will be immediately notified, and the individual will be flagged for additional screening before gaining access to the stadium or arena.

The MODS may be constructed to be easily transported from one venue to another, and be quickly deployed. Event goers, along with onsite venue staff and talent, simply walk through a mobile checkpoint in 4 simple steps without the need to empty their pockets of keys, cellphones, wallets, change or other personal items.

The present disclosure comprises at least the following aspects:

Aspect 1. A modular on-site detection system comprising: a portable structure configured to be placed on a surface between a first area and a second area, the portable structure comprising a first wall configured to face the first area and a second wall opposite the first wall and configured to face the second area; a plurality of passage lanes defined between the first wall and the second wall, where each of the passage lanes is physically partitioned from each other; a control area at least partially disposed between the first wall and the second wall and physically partitioned from each of the passage lanes; a plurality of entrance openings formed in the first wall and a plurality of exit openings formed in the second wall, each pair of the entrance openings and exit openings associated with a respective one of the passage lanes to allow one or more entrants to pass from the first area into the respective one of the passage lanes and from the respective one of the passage lanes to the second area; a network of threat detection systems in data communication with at least a monitoring system, wherein the network comprises: a parking lot system configured to capture information relating to contents of a target parking lot or activities occurring in the target parking lot; a first sensor system comprising one or more first video cameras secured to the portable structure and configured to face the first area and a first intelligent video recognition software configured to analyze the information captured by the one or more first video cameras for automatically screening at least a portion of the first area for visible threats; an intelligent covert weapons detection system comprising a multi-sensor gateway disposed in each of the passage lanes for scanning one or more entrants in the passage lanes for covert suspect objects as the one or more users move through the passage lane; an intelligent thermal detection system comprising one or more thermal sensors disposed in each of the passage lanes for measuring a temperature of one or more users in the passage lanes; an identification system disposed to determine an identification of at least one or more of the entrants in each of the passage lanes; a second sensor system comprising one or more second video cameras secured to the portable structure and configured to face the second area and a second intelligent video recognition software configured to analyze the information captured by the one or more second video cameras for automatically screening at least a portion of the second area; and the monitoring system disposed in the control room and configured to receive information from each of the parking lot system, the first sensor system, the intelligent covert weapons detection system, the intelligent thermal detection system, the second sensor system, and the identification system, and to provide feedback based at least on the received information, wherein the monitoring system is configured to determine, based on the received information and a set of security rules, an alarm condition indicative of one or more of the entrants posing a threat, and wherein the monitoring system is configured to transmit an alarm notice to one or more connected devices indicative of the alarm condition and comprising information relating to the threat.

Aspect 2. The system of Aspect 1, wherein the parking lot system comprises one or more of robotic detection devices or drones configured to capture information relating to contents of a target parking lot or activities occurring in the target parking lot.

Aspect 3. The system of any one of Aspects 1-2, wherein one or more of the first senor system or the second sensor system further comprises one or more of visible light cameras, infra-red cameras, magnetometers, chemical sensors, radioactive sensors, or biological sensors.

Aspect 4. The system of any one of Aspects 1-3, wherein the first intelligent video recognition software uses a trained convolutional neural network to classify whether the detected signal belongs to a group of threat signals.

Aspect 5. The system of any one of Aspects 1-4, wherein the intelligent covert weapons detection system uses a trained convolutional neural network to classify whether the detected signal belongs to a group of threat signals.

Aspect 6. The system of any one of Aspects 1-5, wherein the second intelligent video recognition software uses a trained convolutional neural network to classify whether the detected signal belongs to a group of threat signals.

Aspect 7. The system of any one of Aspects 1-6, wherein the one or more thermal sensors comprise a visible camera and the computer uses a trained convolutional neural network to classify whether a person is wearing a facemask.

Aspect 8. The system of any one of Aspects 1-7, wherein the one or more thermal sensors is an infra-red camera and the intelligent thermal detection system is configured to determine, based on input from the infra-red camera, when a user has a body temperature greater than or equal to 38° C.

Aspect 9. A method of multi-zonal threat detection from a portable structure, the method comprising: disposing a portable structure on a surface between a first area and a second area, the portable structure comprising: a first wall configured to face the first area and a second wall opposite the first wall and configured to face the second area; a plurality of passage lanes defined between the first wall and the second wall, where each of the passage lanes is physically partitioned from each other; a control area at least partially disposed between the first wall and the second wall and physically partitioned from each of the passage lanes; a plurality of entrance openings formed in the first wall and a plurality of exit openings formed in the second wall, each pair of the entrance openings and exit openings associated with a respective one of the passage lanes to allow one or more entrants to pass from the first area into the respective one of the passage lanes and from the respective one of the passage lanes to the second area; receiving lot information from a parking lot system configured to capture information relating to contents of a target parking lot or activities occurring in the target parking lot; receiving threat information from each of: a first sensor system comprising one or more first video cameras secured to the portable structure and configured to face the first area a first intelligent video recognition software configured to analyze the information captured by the one or more first video cameras for automatically screening at least a portion of the first area for visible threats; an intelligent covert weapons detection system comprising a multi-sensor gateway disposed in each of the passage lanes for scanning one or more entrants in the passage lanes for covert suspect objects as the one or more users move through the passage lane; an intelligent thermal detection system comprising one or more thermal sensors disposed in each of the passage lanes for measuring a temperature of one or more users in the passage lanes; an identification system disposed to determine an identification of at least one or more of the entrants in each of the passage lanes; and a second sensor system comprising one or more second video cameras secured to the portable structure and configured to face the second area and a second intelligent video recognition software configured to analyze the information captured by the one or more second video cameras for automatically screening at least a portion of the second area; and determining, based on the received threat information and a set of security rules, a visible alarm condition indicative of one or more of the entrants posing a visible threat; determining, based on the received threat information and a set of security rules, a covert alarm condition indicative of one or more of the entrants posing a covert threat; determining, based on the received threat information and a set of security rules, a health alarm condition indicative of one or more of the entrants exhibiting a health condition;

determining, based on the received threat information and a set of security rules, an identity alarm condition indicative of one or more of the entrants posing an identity threat or failing to provide proper access identity; transmitting an alarm notice to one or more connected devices indicative of one or more of the visible alarm condition, the covert alarm condition, the health alarm condition, or the identity alarm condition, and comprising information relating to the threat.

Aspect 10. The method of claim 9, wherein determining an alarm condition indicative of one or more of the entrants posing a threat is based on a machine learning algorithm.

Aspect 11. A modular on-site detection system comprising: a portable structure configured to be placed on a surface between a first area and a second area, the portable structure comprising a first wall configured to face the first area and a second wall opposite the first wall and configured to face the second area; a plurality of passage lanes defined between the first wall and the second wall, where each of the passage lanes is physically partitioned from each other; a control area at least partially disposed between the first wall and the second wall and physically partitioned from each of the passage lanes; a plurality of entrance openings formed in the first wall and a plurality of exit openings formed in the second wall, each pair of the entrance openings and exit openings associated with a respective one of the passage lanes to allow one or more users to pass from the first area into the respective one of the passage lanes and from the respective one of the passage lanes to the second area; a first sensor system comprising one or more first video cameras secured to the portable structure and configured to face the first area and a first intelligent video recognition software configured to analyze the information captured by the one or more first video cameras for automatically screening at least a portion of the first area; an intelligent covert weapons detection system comprising a multi-sensor gateway disposed in each of the passage lanes for scanning one or more users in the passage lanes for covert suspect objects as the one or more users move through the lane; an intelligent thermal detection system comprising one or more thermal sensors disposed in each of the passage lanes for measuring a temperature of one or more users in the passage lanes; an identification system disposed to determine an identification of at least one or more of the users in each of the passage lanes; a second sensor system comprising one or more second video cameras secured to the portable structure and configured to face the second area and a second intelligent video recognition software configured to analyze the information captured by the one or more second video cameras for automatically screening at least a portion of the second area; and a monitoring system disposed in the control room and configured to receive information from each of the first sensor system, the intelligent covert weapons detection system, the intelligent thermal detection technology, the second sensor system, and the identification system, and to provide feedback based at least on the received information, wherein the monitoring system is configured to determine, based on the received information and a set of security rules, an alarm condition indicative of one or more of the users posing a threat.

Aspect 12. The system of claim 11, wherein one or more of the first senor system or the second sensor system further comprises one or more of visible light cameras, infra-red cameras, magnetometers, chemical sensors, radioactive sensors, or biological sensors.

Aspect 13. The system of any one of Aspects 11-12, wherein the first intelligent video recognition software uses a trained convolutional neural network to classify whether the detected signal belongs to a group of threat signals.

Aspect 14. The system of any one of Aspects 11-13, wherein the intelligent covert weapons detection system uses a trained convolutional neural network to classify whether the detected signal belongs to a group of threat signals.

Aspect 15. The system of any one of Aspects 11-14, wherein the second intelligent video recognition software uses a trained convolutional neural network to classify whether the detected signal belongs to a group of threat signals.

Aspect 16. The system of any one of Aspects 11-15, wherein the one or more thermal sensors comprise a visible camera and the computer uses a trained convolutional neural network to classify whether a person is wearing a facemask.

Aspect 17. The system of any one of Aspects 11-16, wherein the one or more thermal sensors is an infra-red camera and the intelligent thermal detection system is configured to determine, based on input from the infra-red camera, when a user has a body temperature greater than or equal to 38° C.

While embodiments of the disclosure have been illustrated and described, it is not intended that these embodiments illustrate and describe all possible forms of the disclosure. Various changes, modifications, and alterations in the teachings of the present disclosure may be contemplated by those skilled in the art without departing from the intended spirit and scope thereof. It is intended that the present disclosure encompass such changes and modifications.

Although shown and described is what is believed to be the most practical and preferred embodiments, it is apparent that departures from specific designs and methods described and shown will suggest themselves to those skilled in the art and may be used without departing from the spirit and scope of the disclosure. For example, the systems, devices and methods described herein for removal of lesions from the lung. It will be appreciated by the skilled artisan that the devices and methods described herein may are not limited to the lung and could be used for tissue resection and lesion removal in other areas of the body. The present disclosure is not restricted to the particular constructions described and illustrated, but should be constructed to cohere with all modifications that may fall within the scope of the appended claims.

What is claimed is:

1. A modular on-site detection system comprising:
a portable structure configured to be placed on a surface between a first area and a second area, the portable structure comprising a first wall configured to face the first area and a second wall opposite the first wall and configured to face the second area;
a plurality of passage lanes defined between the first wall and the second wall, where each of the passage lanes is physically partitioned from each other;
a control area at least partially disposed between the first wall and the second wall and physically partitioned from each of the passage lanes;
a plurality of entrance openings formed in the first wall and a plurality of exit openings formed in the second wall, each pair of the entrance openings and exit openings associated with a respective one of the passage lanes to allow one or more entrants to pass from the first area into a respective one of the passage lanes and from the respective one of the passage lanes to the second area;

a network of threat detection systems in data communication with at least a monitoring system, wherein the network comprises:
  a parking lot system configured to capture information relating to contents of a target parking lot or activities occurring in the target parking lot;
  a first sensor system comprising one or more first video cameras secured to the portable structure and configured to face the first area and a first intelligent video recognition software configured to analyze the information captured by the one or more first video cameras for automatically screening at least a portion of the first area for visible threats;
  an intelligent covert weapons detection system comprising a multi-sensor gateway disposed in each of the passage lanes for scanning one or more entrants in the passage lanes for covert suspect objects as the one or more entrants move through the passage lane;
  an intelligent thermal detection system comprising one or more thermal sensors disposed in each of the passage lanes for measuring a temperature of one or more entrants in the passage lanes;
  an identification system disposed to determine an identification of at least one or more of the entrants in each of the passage lanes;
  a second sensor system comprising one or more second video cameras secured to the portable structure and configured to face the second area and a second intelligent video recognition software configured to analyze the information captured by the one or more second video cameras for automatically screening at least a portion of the second area; and
  the monitoring system disposed in the control area and configured to receive information from each of the parking lot system, the first sensor system, the intelligent covert weapons detection system, the intelligent thermal detection system, the second sensor system, and the identification system, and to provide feedback based at least on the received information, wherein the monitoring system is configured to determine, based on the received information and a set of security rules, an alarm condition indicative of one or more of the entrants posing a threat, and wherein the monitoring system is configured to transmit an alarm notice to one or more connected devices indicative of the alarm condition and comprising information relating to the threat.

2. The system of claim 1, wherein the parking lot system comprises one or more of robotic detection devices or drones configured to capture information relating to contents of a target parking lot or activities occurring in the target parking lot.

3. The system of claim 1, wherein one or more of the first sensor system or the second sensor system further comprises one or more of visible light cameras, infra-red cameras, magnetometers, chemical sensors, radioactive sensors, or biological sensors.

4. The system of claim 1, wherein the first intelligent video recognition software uses a trained convolutional neural network to classify whether a detected signal belongs to a group of threat signals.

5. The system of claim 1, wherein the intelligent covert weapons detection system uses a trained convolutional neural network to classify whether a detected signal belongs to a group of threat signals.

6. The system of claim 1, wherein the second intelligent video recognition software uses a trained convolutional neural network to classify whether a detected signal belongs to a group of threat signals.

7. The system of claim 1, wherein the one or more thermal sensors comprise a visible camera and a computer uses a trained convolutional neural network to classify whether a person is wearing a facemask.

8. The system of claim 1, wherein the one or more thermal sensors is an infra-red camera and the intelligent thermal detection system is configured to determine, based on input from the infra-red camera, when an entrant has a body temperature greater than or equal to 38° C.

9. A method of multi-zonal threat detection from a portable structure, the method comprising:
  disposing a portable structure on a surface between a first area and a second area, the portable structure comprising:
    a first wall configured to face the first area and a second wall opposite the first wall and configured to face the second area;
    a plurality of passage lanes defined between the first wall and the second wall, where each of the passage lanes is physically partitioned from each other;
    a control area at least partially disposed between the first wall and the second wall and physically partitioned from each of the passage lanes;
    a plurality of entrance openings formed in the first wall and a plurality of exit openings formed in the second wall, each pair of the entrance openings and exit openings associated with a respective one of the passage lanes to allow one or more entrants to pass from the first area into a respective one of the passage lanes and from the respective one of the passage lanes to the second area;
  receiving lot information from a parking lot system configured to capture information relating to contents of a target parking lot or activities occurring in the target parking lot;
  receiving threat information from each of:
    a first sensor system comprising one or more first video cameras secured to the portable structure and configured to face the first area a first intelligent video recognition software configured to analyze the information captured by the one or more first video cameras for automatically screening at least a portion of the first area for visible threats;
    an intelligent covert weapons detection system comprising a multi-sensor gateway disposed in each of the passage lanes for scanning one or more entrants in the passage lanes for covert suspect objects as the one or more entrants move through the passage lane;
    an intelligent thermal detection system comprising one or more thermal sensors disposed in each of the passage lanes for measuring a temperature of one or more entrants in the passage lanes;
    an identification system disposed to determine an identification of at least one or more of the entrants in each of the passage lanes; and
    a second sensor system comprising one or more second video cameras secured to the portable structure and configured to face the second area and a second intelligent video recognition software configured to analyze the information captured by the one or more second video cameras for automatically screening at least a portion of the second area; and determining, based on the received threat information and a set of security rules, a visible alarm condition indicative of one or more of the entrants posing a visible threat;

determining, based on the received threat information and a set of security rules, a covert alarm condition indicative of one or more of the entrants posing a covert threat;

determining, based on the received threat information and a set of security rules, a health alarm condition indicative of one or more of the entrants exhibiting a health condition;

determining, based on the received threat information and a set of security rules, an identity alarm condition indicative of one or more of the entrants posing an identity threat or failing to provide proper access identity;

transmitting an alarm notice to one or more connected devices indicative of one or more of the visible alarm condition, the covert alarm condition, the health alarm condition, or the identity alarm condition, and comprising information relating to the threat.

10. The method of claim 9, wherein determining an alarm condition indicative of one or more of the entrants posing a threat is based on a machine learning algorithm.

11. A modular on-site detection system comprising:

a portable structure configured to be placed on a surface between a first area and a second area, the portable structure comprising a first wall configured to face the first area and a second wall opposite the first wall and configured to face the second area;

a plurality of passage lanes defined between the first wall and the second wall, where each of the passage lanes is physically partitioned from each other;

a control area at least partially disposed between the first wall and the second wall and physically partitioned from each of the passage lanes;

a plurality of entrance openings formed in the first wall and a plurality of exit openings formed in the second wall, each pair of the entrance openings and exit openings associated with a respective one of the passage lanes to allow one or more users to pass from the first area into a respective one of the passage lanes and from the respective one of the passage lanes to the second area;

a first sensor system comprising one or more first video cameras secured to the portable structure and configured to face the first area and a first intelligent video recognition software configured to analyze information captured by the one or more first video cameras for automatically screening at least a portion of the first area;

an intelligent covert weapons detection system comprising a multi-sensor gateway disposed in each of the passage lanes for scanning one or more users in the passage lanes for covert suspect objects as the one or more users move through the lane;

an intelligent thermal detection system comprising one or more thermal sensors disposed in each of the passage lanes for measuring a temperature of one or more users in the passage lanes;

an identification system disposed to determine an identification of at least one or more of the users in each of the passage lanes;

a second sensor system comprising one or more second video cameras secured to the portable structure and configured to face the second area and a second intelligent video recognition software configured to analyze the information captured by the one or more second video cameras for automatically screening at least a portion of the second area; and a monitoring system disposed in the control area and configured to receive information from each of the first sensor system, the intelligent covert weapons detection system, the intelligent thermal detection system, the second sensor system, and the identification system, and to provide feedback based at least on the received information, wherein the monitoring system is configured to determine, based on the received information and a set of security rules, an alarm condition indicative of one or more of the users posing a threat.

12. The system of claim 11, wherein one or more of the first sensor system or the second sensor system further comprises one or more of visible light cameras, infra-red cameras, magnetometers, chemical sensors, radioactive sensors, or biological sensors.

13. The system of claim 11, wherein the first intelligent video recognition software uses a trained convolutional neural network to classify whether a detected signal belongs to a group of threat signals.

14. The system of claim 11, wherein the intelligent covert weapons detection system uses a trained convolutional neural network to classify whether a detected signal belongs to a group of threat signals.

15. The system of claim 11, wherein the second intelligent video recognition software uses a trained convolutional neural network to classify whether a detected signal belongs to a group of threat signals.

16. The system of claim 11, wherein the one or more thermal sensors comprise a visible camera and a computer uses a trained convolutional neural network to classify whether a person is wearing a facemask.

17. The system of claim 11, wherein the one or more thermal sensors is an infra-red camera and the intelligent thermal detection system is configured to determine, based on input from the infra-red camera, when a user has a body temperature greater than or equal to 38° C.

* * * * *